Dec. 7, 1948.  G. E. GAGNIER  2,455,669

SELF-SUPPORTING RESILIENT ARTICLE

Filed Aug. 5, 1947

INVENTOR.
George E. Gagnier,
BY
Harness, Dickey & Pierce
ATTORNEYS.

Patented Dec. 7, 1948

2,455,669

UNITED STATES PATENT OFFICE 2,455,669

SELF-SUPPORTING RESILIENT ARTICLE

George E. Gagnier, Detroit, Mich.

Application August 5, 1947, Serial No. 766,167

4 Claims. (Cl. 16—86)

The present invention relates to the construction of reinforced self-supporting articles coated with or carrying surfaces of rubber or other relatively soft or resilient materials and suitable for use as anti-rattle buffers and the like such as are employed in vehicle construction to take up clearances between and prevent rubbing and rattling of relatively movable body parts such as engine hoods, trunk lids and the like. The invention is particularly useful in the fabrication of anti-rattle buffers for motor vehicles because such devices are called upon to withstand severe mechanical service and abuse, and unfavorable atmospheric and temperature conditions, despite which the utmost economy and ease of assembly are important, but it will be recognized that the invention is readily applicable to many other uses.

It is an object of the invention to provide a rubber-headed article adapted to serve as a resilient bumper or clearance take-up and anti-rattle device of novel and improved character, incorporating improved attaching means whereby it may be quickly and easily attached to a support such as a sheet metal panel and which attaching means is operable with equal ease and speed regardless of whether or not access may be had to both sides of the supporting panel. A related object is to incorporate improved attaching means adapted to hold such a device very securely in position but which permits it to be intentionally removed when desired.

It is also an object of the invention to provide improved self-supporting molded articles having soft surfaces provided with reinforcing and supporting means so mechanically interconnected that unwanted separation of the molded surface material from the supporting and reinforcing means is effectively prevented and the strength of the completed article is substantially greater than that of previously known constructions wherein metal attaching devices are incorporated with relatively soft body or head portions. The problems involved in the construction of satisfactory devices of the indicated character are aggravated by the tendency of metal attaching means to separate from rubber in which it is secured merely by molding the rubber around a portion of the metal. Because no satisfactory, economical solution has been found to this problem, it has become customary to form soft rubber bumper elements and the like with integral rubber fastening head portions joined to the bumper body by means of a reduced neck, so that the head may be deformed and forced through a hole in a supporting sheet metal member, for example, in such a manner that the head will thereafter expand and retain the body upon the opposite side of the support. The securing of such homogeneous rubber members is a relatively laborious operation and cannot be performed satisfactorily unless both sides of the supporting sheet or panel are accessible. With my improved construction, however, metal supporting portions are provided which permit such a device as a resilient bumper to be attached to a supporting panel in a quick and easy manner, even though only one side of the panel may be accessible, while the metal portions are so united to the soft body that separation of the parts under ordinary usage, and even in the event of severe mechanical abuse, is rendered unlikely.

Other objects and advantages will be apparent upon consideration of the present disclosure in its entirety.

In the drawing:

Figure 1 is a substantially diametric cross-sectional view of a rubber headed anti-rattle bumper such as is employed in motor car constructions to prevent rattling to take up clearance, and cushion the closing of the lids or doors of luggage compartments, hood sections and the like;

Figure 1:
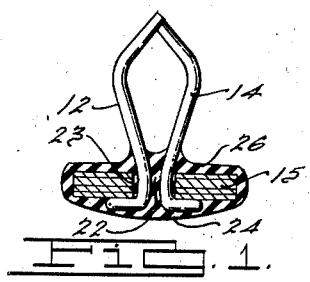
Figure 2:
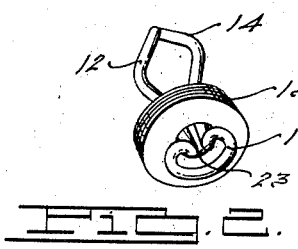
Fig. 2 is a perspective view of the fastening and reinforcing means as they appear prior to application of the resilient coating material.

Referring now to the drawing, reference character 10 designates the generaly circular head portion of a spring clip fastener of the type disclosed in Place Patent No. 1,679,266, although it will be appreciated that the precise construction of the spring fastener may be varied without departure from the broader aspects of the present invention, the particular construction of the patent referred to being especially suitable, however, and typifying my preferred practice in the present state of development of the invention herein disclosed. Spring fasteners of the indicated variety are commonly formed of a single length of spring wire, as shown in Figs. 1 and 2. A shank projects perpendicularly from the plane of the head portion 10 of the fastener, being formed by leg sections 12, 14 extending approximately from the center of the generally circular area which is substantially circumscribed by the head portion. The spring wire leg portions 12, 14 diverge from one another for a substantial proportion of their length, the length of their divergent portions depending upon the thickness of the material to which the fastener is to be attached, while the desired resistance to detachment of the fastener when applied is a controlling factor in the angle of divergence of these leg portions, as will be appreciated by those skilled in the art. The leg portions then converge to substantially meeting but overlapping relation at their extremities so that when pushed into a socket or opening in a suitable support the legs may spring laterally and cross one another scissors-fashion, as will also be appreciated.

A washer-like reinforcing and head supporting portion 15 which may be of laminar nonmetallic construction, formed of fiber or the like, is applied to the shank of the fastener assembly directly beneath the head 10, as best shown in Fig. 2, the head being thus provided with a considerably enlarged supporting surface portion. A relatively thick coating of soft material, such as soft rubber, is then applied over the head and reinforcing washer 15, as by dipping the assembly in a molten rubber solution 16 in the manner diagrammatically indicated in Fig. 3. The rubber solution may be in a simple open tank 18, and a plurality of the preassembled spring fasteners and head reinforcing washer portions 15 are shown strung upon a supporting rod 20 which may be employed to provide convenient means whereby a plurality of such assemblies may be dipped into the solution, in the manner shown in Fig. 3, to a depth sufficient to coat the heads thereof. It will be understood that the rod 20 may be supported and moved by a suitable conveyer, fragmentarily shown at 21.

Since the leg portions 12, 14 of the fastener which extend through the central opening 23 in the washer-like head element 15 do not fill such opening, it will be appreciated that the rubber solution also penetrates such central opening, filling the same and providing a connecting neck-like rubber portion, generally designated 22, effectively tying together the top layer 24 and the bottom layer 26 of the rubber coating above and below the head supporting elements. This will be seen to greatly augment the mechanical strength and tenacity of the rubber coating, which is thus held upon the head supporting means in a manner to resist severe abuse and with such adherence that it may be employed under such severe service conditions as are met with when assemblies of this character are utilized to cushion parts subjected to severe vibration and frequent opening and closing, despite the fact that the rubber may be applied by a simple and economical dipping operation.

Figure 4:
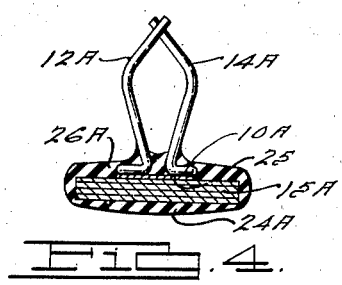
Fig. 4 is a cross-sectional view of a buffer of somewhat modified construction.

In the somewhat modified construction shown in Fig. 4, the head portion 10A of the spring wire fastener is secured to the underside of the imperforate head reinforcing disk 15A as by means of cement. The layer of cement is designated 25. The spring wire fastener will be seen to be similar in construction to that of the first described embodiment, although formed of lighter gauge wire, and it will be appreciated that the mechanical securance of the fastener with respect to the resiliently coated head assembly is somewhat weaker. It will be appreciated, therefore, that the present embodiment is suitable for use where lateral forces and forces tending to separate the head from the fastener are less severe, but where it is desired to provide better shielding of the metallic parts of the fastener against contact by the cushioned element. The nonmetallic disk 15A furnishes a backing for the rubber top coating 24A of the head assembly and is interposed between such coating and the head 10A of the metal fastener. The rubber coating is applied to the assembly to a depth sufficient to cover not only the head portion but a part of the shank of the fastener, and a large interengaged surface area between the rubber and the metal fastener is thus provided, as a result of which there is good adhesion of the rubber, which also, after application, ties the reinforcing disk 15A to the head 10A.

Figure 5:
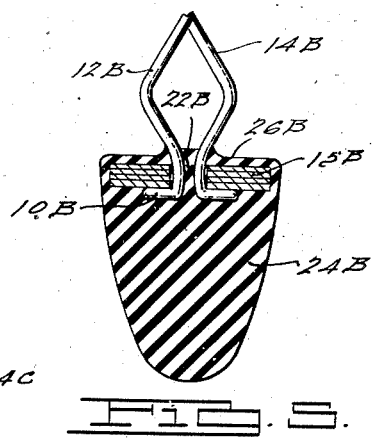
Figs. 5 and 6 are cross-sectional views similar to Fig. 1, showing additional modifications.
Figure 3:
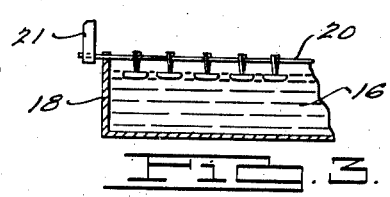
Fig. 3 is a fragmentary and somewhat diagrammatic view of a dip tank and a plurality of buffers in process of dipping.

The further modification shown in Fig. 5 will be seen to be analogous to that of the embodiments of Figs. 1, 2 and 3 except that the molded rubber head coating 24B is elongated axially to provide a greatly thickened rubber cushion overlying the supporting and reinforcing portions 10B, 15B. It will be appreciated that an enlarged head of this character may be conveniently formed by molding and that, due to the integral connecting rubber neck portion 22B which is automatically formed in the central opening 23B of the washer-like reinforcing element 15B, the head portion 24B is securely tied to the bottom layer 26B of the coating, as a result of which the unwanted separation of the head from the fastening and reinforcing portions is very strongly resisted and the assembly is capable of withstanding heavy forces and severe mechanical abuse.

Figure 6:
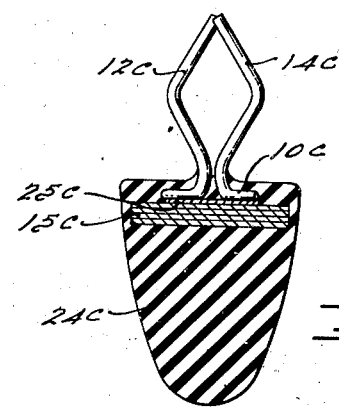

The modified construction shown in Fig. 6, although of lesser mechanical strength, will be found adequate for certain uses and may be assembled somewhat more economically, the general construction corresponding to that of the modification depicted in Fig. 4, except that the head portion 24C is enlarged and corresponds generally to that of the embodiment in Fig. 5. The head 10C of the spring clip fastener is secured as by cementing at 25C to the underside of a reinforcing disk 15C and the enclosing and cushioning rubber head material surrounds the entire assembly of head and reinforcing disk and extends a short distance along the shank of the fastener to tie the parts together and assist in holding the rubber upon the supporting means.

While it will be apparent that only the preferred embodiments of my invention have been described in detail, it will be appreciated that various further modifications of the form, number and arrangement of the parts may be made without departing from the spirit of the invention and the scope of the appended claims.

I claim:

1. An article of the character described including a spring fastener of the type having a head and a shank, a washer-like reinforcing element having a central opening therein of greater cross-sectional area than that of said shank and mounted upon said shank adjacent the head, and a resilient coating overlying said reinforcing element and head and extending upon both sides of said reinforcing element, an integral portion of said coating extending through said opening to tie together the coating portions upon opposite sides of said reinforcing element.

2. A cushion headed element suitable for use as a buffer or the like comprising a spring clip-type fastening member having a shank and a head transverse with respect to the shank, an enlarged head reinforcing element adjacent the head of the fastener and a relatively soft resilient coating surrounding both said head and said element and engaging at least a part of said shank.

3. Means as set forth in claim 2 in which said reinforcing element is mounted upon said shank.

4. Means as set forth in claim 2 in which said reinforcing element is secured to said head by means of an adhesive.

GEORGE E. GAGNIER.

REFERENCES CITED

The following references are of record in the file of this patent:

UNITED STATES PATENTS

| Number | Name | Date |
| --- | --- | --- |
| 268,697 | Lewis | Dec. 5, 1882 |
| 1,679,266 | Place | July 31, 1928 |
| 1,755,288 | Eastman | Apr. 22, 1930 |
| 1,915,249 | Jorgensen | June 20, 1933 |
| 2,226,615 | Killen | Dec. 31, 1940 |